United States Patent
Francesco

(12) 
(10) Patent No.: US 6,537,430 B1
(45) Date of Patent: Mar. 25, 2003

(54) SYSTEM FOR GALVANIC TREATMENT OR FINISHING OF PIECES, AND CORRESPONDING METHOD

(76) Inventor: La Gala Francesco, Via Montesordo, 1, 22072 Cermenate (Como) (IT)

( * ) Notice: Subject to any disclaimer, the term of this patent is extended or adjusted under 35 U.S.C. 154(b) by 0 days.

(21) Appl. No.: 09/363,037

(22) Filed: Jul. 29, 1999

(51) Int. Cl.$^7$ ................................................ C25D 7/00
(52) U.S. Cl. ...................... 204/213; 204/212; 204/199; 204/198
(58) Field of Search ................................ 204/206, 207, 204/227, 213, 212, 198, 199

(56) References Cited

U.S. PATENT DOCUMENTS

| | | | | |
|---|---|---|---|---|
| 1,563,041 A | * | 11/1925 | Puriton | 204/214 |
| 3,099,275 A | * | 7/1963 | Pianowski | 134/140 |
| 3,444,803 A | | 5/1969 | Barton | |
| 3,974,057 A | * | 8/1976 | Henig | 204/213 |
| 4,390,399 A | * | 6/1983 | McInnes | 204/32 R |
| 4,422,774 A | * | 12/1983 | Little | 366/347 |
| 4,425,212 A | * | 1/1984 | Francis | 204/202 |
| 4,769,117 A | * | 9/1988 | Shiono et al. | 204/214 |
| 5,417,829 A | * | 5/1995 | Zecher | 204/214 |

FOREIGN PATENT DOCUMENTS

| | | | |
|---|---|---|---|
| GB | 790006 | | 7/1955 |
| GB | 790006 A | * | 1/1958 |
| GB | 1 583 854 | | 2/1981 |
| GB | 1583854 A | * | 2/1981 |
| JP | 55085697 | * | 6/1980 |
| JP | 63134420 | * | 7/1986 |

OTHER PUBLICATIONS

Patent Abstracts of Japan, vol. 004, No. 135, (C–025), Sep. 20, 1980 (corresponds to JPA 55–85697).

Patent Abstracts of Japan, vol. 013, No. 156, (C–585), Apr. 14, 1989.

Patent Abstracts of Japan, vol. 012, No. 381, (M–752), Oct. 12, 1988 (corresponds to JPA 63–134420).

* cited by examiner

*Primary Examiner*—Nam Nguyen
*Assistant Examiner*—Erica Smith-Hicks
(74) *Attorney, Agent, or Firm*—Sughrue Mion, PLLC

(57) ABSTRACT

In at least one bath of the system, tumbling barrels containing pieces to be treated are arranged with their respective longitudinal axes set parallel to or coinciding with the longitudinal axis of the bath and are free to move longitudinally along the bath, supported by idle wheels resting on the edges of the bath. At least one pusher in each bath is free to move for a length longitudinally and engages a frame of a barrel at a trailing position to push the said barrel and possible barrels in front of it in an advance direction. The system may comprise a spray wash in sequential stages.

18 Claims, 5 Drawing Sheets

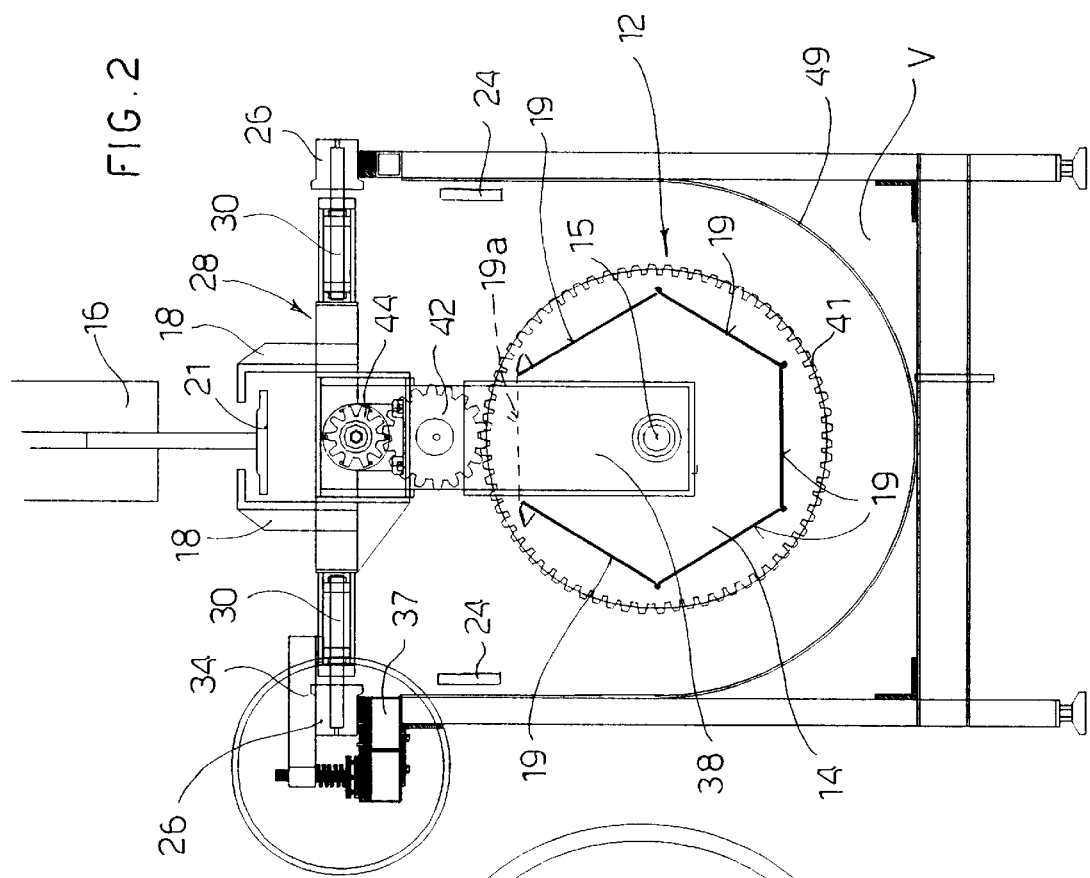
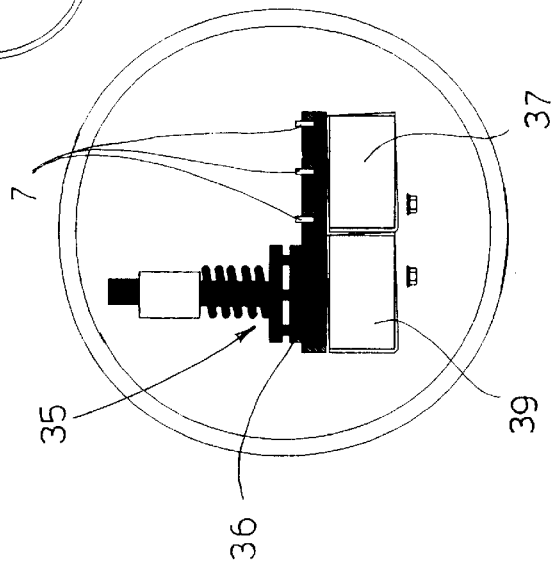
FIG. 2
FIG. 2a

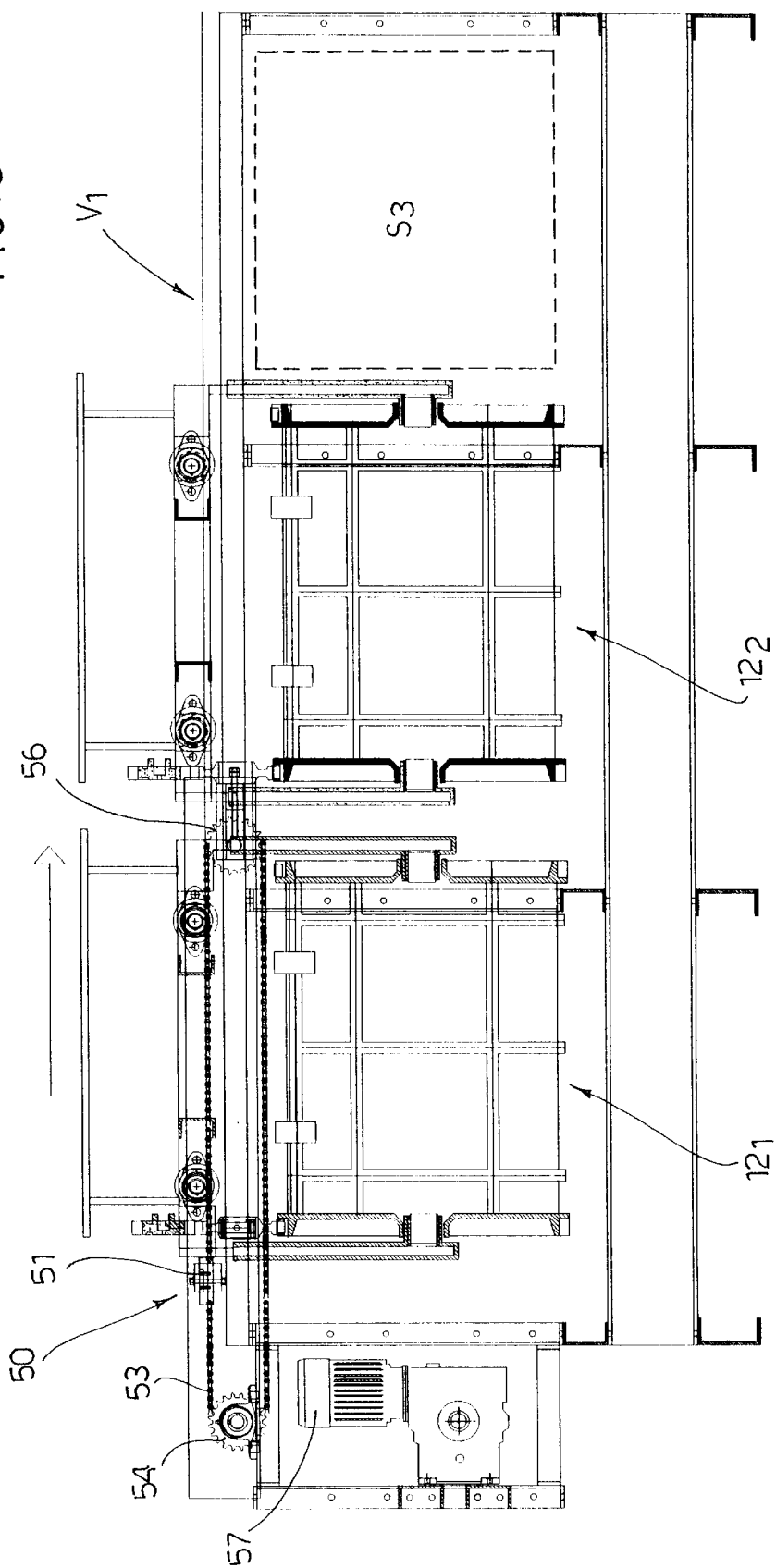

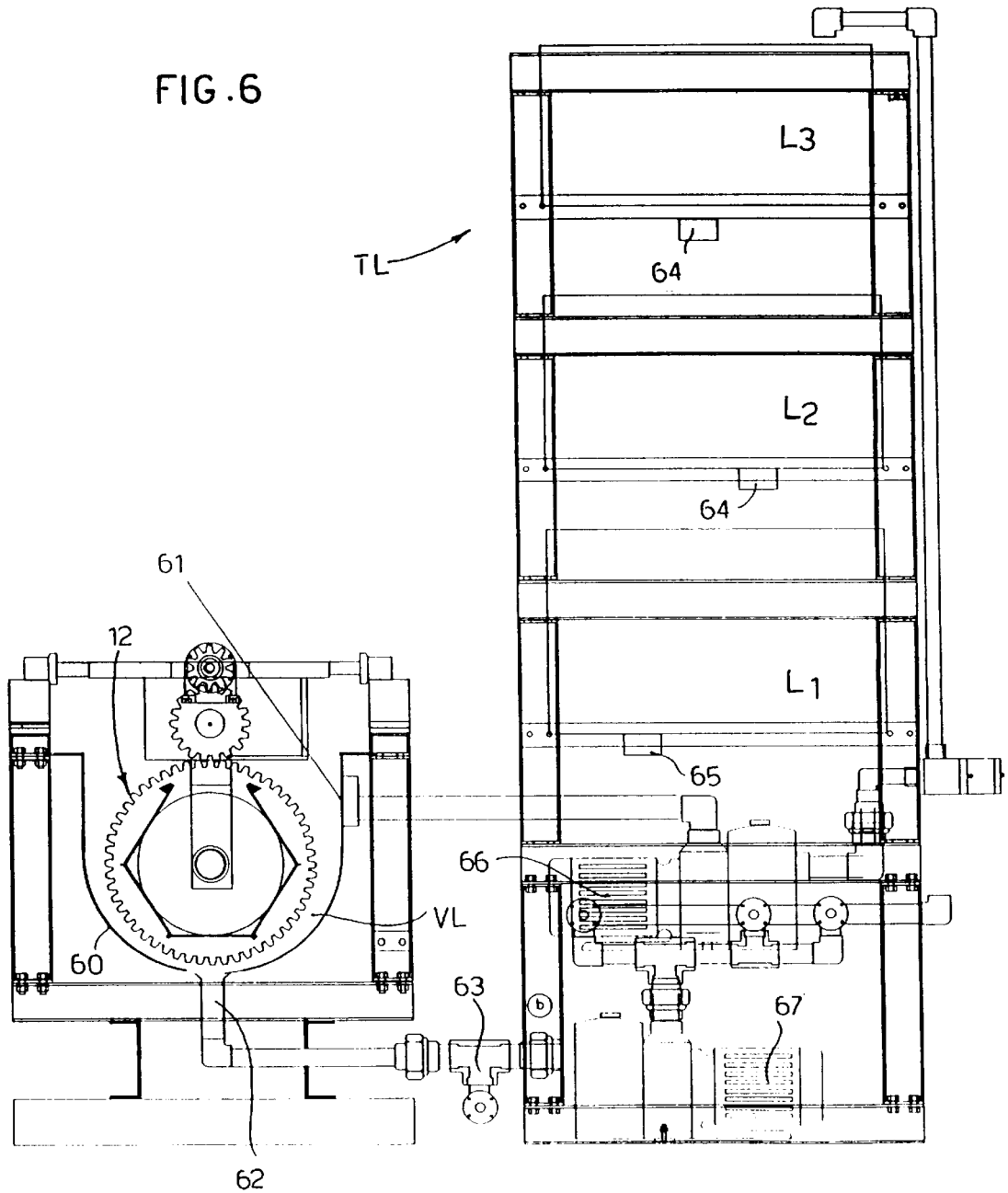

SYSTEM FOR GALVANIC TREATMENT OR FINISHING OF PIECES, AND CORRESPONDING METHOD

DESCRIPTION

The present invention concerns the plating and finishing of metal pieces immersed in a bath and in particular concerns an improved system for galvanic coating or finishing treatments on metal pieces, and in particular small metal items.

In conventional systems for galvanic treatment, for example for zinc plating or galvanizing metal pieces, the pieces are loaded into tumbling barrels, or "tumblers", having a cylindrical or prismatic shape and set with the axis horizontal, the said barrels having perforated walls and an openable door. Each barrel is carried on a supporting frame and is free to turn about its own axis.

The system comprises a set of baths arranged in a line, in which the frame-and-barrel assemblies loaded with the pieces to be treated are immersed. In each of the said baths, a particular stage of the treatment or a stage preliminary to the treatment is carried out, such as washing, degreasing, pickling, de-activation, and zinc coating (galvanization). Generally, a number of barrels are treated simultaneously in the same bath. The barrels are set side by side in each bath in a stationary position, and each barrel is moved from one bath to the subsequent one by means of an overhead travelling crane, which lifts it up, displaces it according to a direction referred to as direction of advance, and lowers it into the new position. The direction of advance and the direction defined by the axes of the barrels are usually orthogonal with respect to one another.

Unavoidably, the barrel being lifted up and undergoing displacement drips onto the underlying barrels in the treatment baths, onto the suction hoods, and onto the anodic bars of the electrodeposition baths, thus causing serious contamination of the solutions. It is obvious that, if an acid drips into a washing bath or, on the other hand, if washing liquid drips into a galvanizing bath, the corresponding washing and galvanizing processes will be of a lower quality.

Another serious drawback with traditional systems, which considerably limits productivity in terms of number of tumblers treated per hour, is due to the fact that, in order to lift out a barrel at the end of the process, an overhead travelling crane must traverse a path in the two directions of movement, i.e., loading and unloading, and the time required ranges between the minimum time necessary for covering a spatial unit occupied by a single barrel and the maximum time necessary for covering n units occupied by n tumblers. This results in a discontinuity in the times of deposition of the metal which has the unfavourable effect of an unevenness of the thicknesses deposited.

Another drawback linked to known systems is the way in which the anodes are distributed. In fact, the anodic bars are set transversely with respect to the baths and parallel to the axes of the barrels, between adjacent barrels, and this reduces the quality of the treatment. In particular, the fact that an anodic bar is shared between two adjacent tumblers produces the undesirable effect of conveying the greater number of cations, and hence more metal, towards the tumbler that presents higher conductivity, at the expense of the other tumbler. In addition, replacement of the anodic bars is particularly inconvenient and dangerous, since the operator in charge must climb onto the baths to carry out periodic replacement.

Another negative effect, in traditional systems, is the difficulty of eliminating emissions of fumes and vapours on account of the long paths traversed, outside the baths, by the barrels soaked with the solutions used in the various processes. In addition, a possible means of aspiration of fumes in traditional systems can be placed only in the limited space that is transverse to the direction of advance between adjacent barrels, and consequently must be equipped with powerful suction appliances, with high costs and only modest results.

Furthermore, in traditional systems control of the current is carried out by placing a current rectifier for each position of electrolytic plating, with an enormous economic expenditure owing to the number of connections and the number of current generators required for electrolytic processes.

The purpose of the present invention is to provide a system for the treatment of pieces that is able to overcome the drawbacks referred to above, and in particular, to prevent dripping of the barrels during their transportation from one bath to another, or rather to prevent the dripping of substances into baths in which the presence of these substances is undesirable.

The above purpose and other purposes are brilliantly achieved by means of a system having the characteristics of the independent claim 1, and by means of a method according to claim 17. Further characteristics of the invention are specified in the dependent claims.

The invention achieves the purposes set, i.e., prevents dripping of the barrels during their progress through the cycle, reduces the times of transportation of the barrels during their progress, prevents discontinuity and unevenness of treatment, facilitates periodic replacement of the anodic bars, enables installation of suction hoods over a wide area of the treatment baths (in that it is not necessary for the overhead travelling crane to have access to the entire extent of the treatment baths), and simplifies the connections for the current required for the electrolytic processes.

BRIEF DESCRIPTION OF DRAWINGS

A detailed exemplary unrestrictive description of the invention will be given, with reference to the figures, in which:

FIG. 2 is a vertical cross section of a treatment bath, enlarged with respect to FIG. 1, with a barrel assembly in it;

FIG. 2a shows the detail encircled in FIG. 2 enlarged;

FIG. 5 is a longitudinal vertical section along a bath with two barrel assemblies in it, and shows the action of a pusher device;

FIG. 6 is a schematic illustration of a washing section of the system represented on a plane orthogonal to the direction of advance of the barrels.

Similar reference numbers in the various figures refer to similar or functionally equivalent parts.

It is moreover pointed out that, even though, for simplicity of description, reference is made to a galvanizing system, the present invention may be equally applied to nickel plating, chrome plating, brass coating, or to non-galvanic finishing treatments. Consequently, terms such as "zinc plating (galvanization) and "zinc" are not to be understood as limiting the present invention.

DETAILED DESCRIPTION OF DRAWINGS

Figure 1:
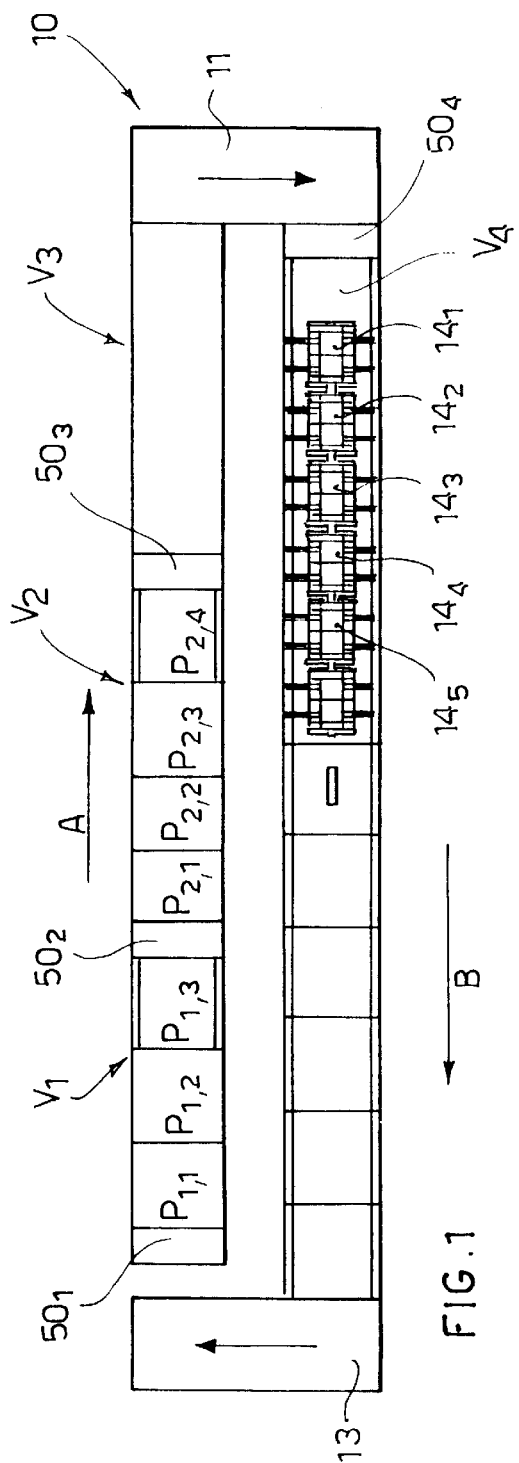
FIG. 1 is a schematic top plan view of a possible embodiment of the system according to the present invention, in which the arrows indicate the direction of advance of the tumbling barrels or tumblers.

With reference first to FIG. 1, a system 10 according to the present invention comprises a set of baths V arranged in longitudinal succession, preferably along two parallel lines. In each bath, one treatment or one treatment stage is performed. The baths $V_1$, $V_2$, $V_3$ are on one branch of the system; the bath $V_4$ is on the other branch of the system. A number of positions inside one bath, destined to be occupied by barrel assemblies, are defined by rectangles and indicated by $P_{1,1}$, $P_{1,2}$, $P_{1,3}$ for the bath $V_1$, $P_{2,1}$, $P_{2,2}$, etc., for the bath $V_2$, and so forth. A direction of advance according to the arrow A, from left to right, is defined for the branch of system appearing at the top of the drawing, and according to the arrow B, from right to left, for the branch appearing at the bottom of the drawing. The two branches are connected at one end, on the right in the figure, by a transfer device, 11, and the second branch presents, at the opposite end, a discharging device 13.

The bath $V_1$ can accept, for example, three barrel assemblies, in positions $P_{1,1}$, $P_{1,2}$, and $P_{1,3}$. At least some of the baths of the system are equipped with a pusher device which will be described later.

In what follows, the term "longitudinal" will be used to indicate a direction parallel to the direction of barrel advance in the system (arrows A and B), and the term "transverse" will be used to indicate a direction transverse to the above-mentioned longitudinal direction.

Figure 4:
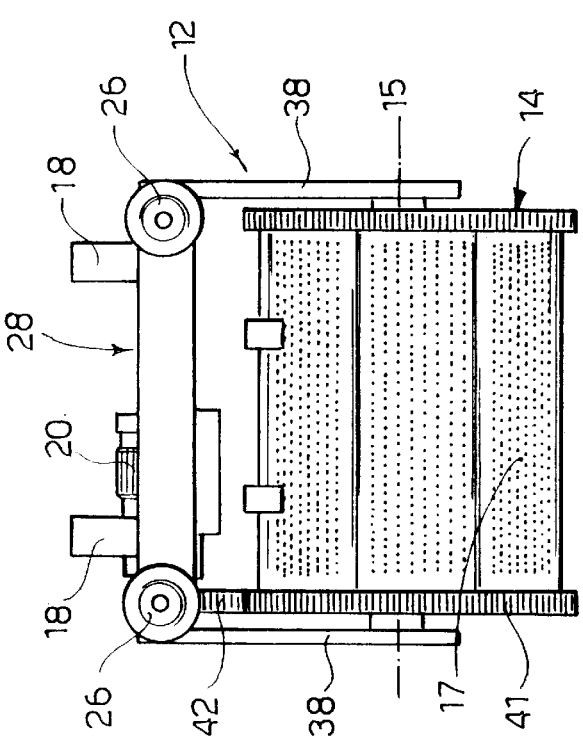
FIG. 4 is a side elevational view of a barrel assembly, according to the invention.
Figure 3:
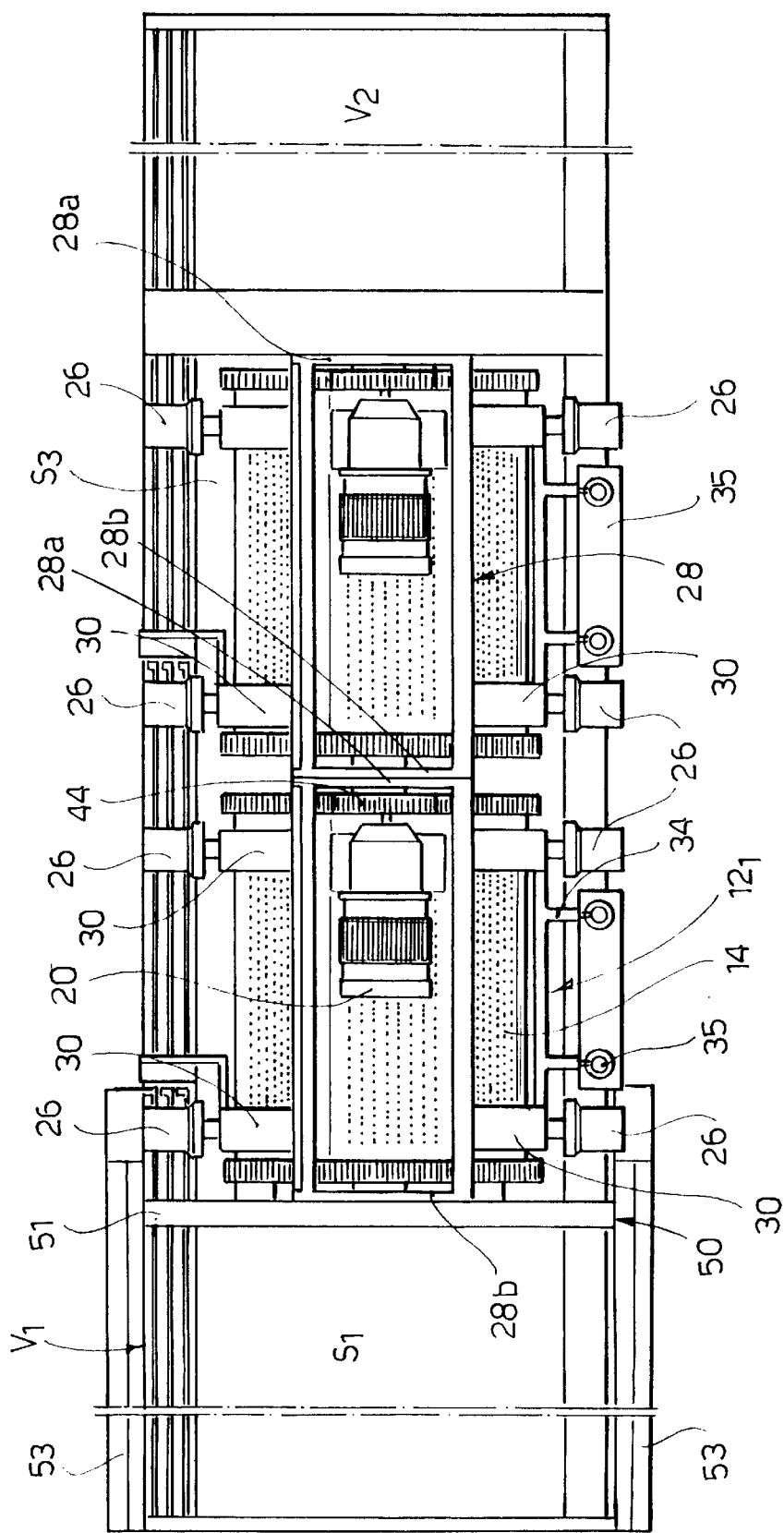
FIG. 3 is a top plan view of a part of a treatment bath with two barrel assemblies in it pushed by a pusher.

With reference now to FIGS. 2, 3 and 4, a barrel assembly according to the invention will be described, and with reference to FIGS. 2 and 3, a bath according to the invention.

A barrel or tumbler assembly 12 according to the invention comprises a tumbling barrel or tumbler 14 supported so that it is free to turn about a horizontal axis 15, carried by a structure or frame 28. The tumbler 14, in a per se known way, comprises a body 17 generally having a polygonal profile, with perforated walls 19. One, 19a, of the walls is hinged to the adjacent wall to serve as a door. The bases of the prism made up by the walls also consist of plane perforated walls mounted on the axis 15 so that they are free to turn. The body is fixed to a gear wheel 41, which meshes with an intermediate wheel 42, driven by a pinion 44, mounted on the output shaft of a motor 20 for turning the barrel. The motor 20 is carried on the frame 28 of the barrel assembly. The supporting frame 28 has opposite axles preferably aligned according to axes contained in planes orthogonal to the axis 15. The axles 30 carry at their distal ends idle wheels 26, which are electrically conducting. Preferably each frame comprises two pairs of axles and two pairs of wheels 26.

Each frame also presents, on one of its sides, current-drawing arms 34, which terminate in slides 35 provided with cathodic contact 36.

The barrel-supporting frame 28 further has hook-like parts 18 designed to be hooked by a hooking means 21 of an overhead travelling crane 16. Preferably, according to the invention, the frame structure of each barrel assembly has a leading wall and a trailing wall which are parallel and are indicated by 28a and 28b. The current-drawing arms 24, through a cathode contact pad 36, conduct treatment current to a current-drawing or current supplier device 38 extending inside the barrel, which transmits polarization current to the metal items contained in the barrel. There is a front current supplier and a rear current supplier. The conductive idle wheels 26, on the other hand, transmit supply current to the motor 20.

Again with reference to FIG. 2, some characteristics of a bath V according to the invention will be explained. On at least one longitudinal edge, the bath V is equipped with a first conducting rail 39 for cathodic current and a second conducting rail, set alongside the first and insulated from it, indicated by 37, for the current supplying the motor. On the rail 37 the wheels 26 make contact on one side, possibly via copper rods 7. On the rail 39, the cathodic contact pad 36 makes contact.

The anodic bars 24 are arranged longitudinally along the bath. Preferably, the bottom of the bath V, indicated by 49, has a semicircular shape, concentric to the axis 15 of the tumbler and with a radius greater than the said tumbler, so as to have an "enveloping" shape, at least in the part below the position of the said axis 15.

According to an important characteristic of the invention, one at least of the baths V of the system is equipped with a pusher device 50.

In FIG. 1, four pusher devices are indicated, i.e., $50_1$ for the bath $V_1$, $50_2$ for the bath $V_2$, $50_3$ for the bath $V_3$, and $50_4$ for the bath $V_4$. A generic pusher 50 is described with reference to FIGS. 3 and 5.

The pusher device basically comprises a transverse bar 51 which moves alternately forwards and backwards along the bath for a stroke corresponding to the length of at least one tumbler assembly. The pusher bar 51 is set at a height such that it can engage the rear transverse bars 28b of the tumbler frame 28. The alternating movement of pushing forward and return of the bar 51 of the pusher can be obtained in any known way. For example, with reference to FIGS. 3 and 5, the bar 51 is mounted on two chains 53, 53, carried at the sides of the bath and moved around gear wheels 54, 56.

There follows an explanation of the operation of the pusher with reference to FIGS. from 1 to 5. A number of barrel assemblies are placed in the bath $V_1$ with their respective axes 15 aligned parallel to the axis of advance A. The barrel assembly furthest to the right in the bath $V_1$, hence at the end of treatment, is picked up by the overhead travelling crane (not illustrated) and moved into the position of start of treatment in the adjacent bath $V_2$. This frees a space $S_3$ on the right in FIG. 5. The advance motor 57 is operated to move the gear wheels 54 so as to cause the pusher bar 51 to advance towards the right in FIG. 5 by a stretch corresponding to the length of a barrel assembly. The stroke of the pusher bar 51 shifts the barrel $12_1$, and this in turn shifts the barrel $12_2$, against which the former barrel is resting, until the latter barrel occupies the space $S_3$ on the right in FIG. 5, and the barrel $12_1$ occupies the space that was previously occupied by the barrel $12_2$. The pusher bar, then, is brought back to the position of start of stroke, thus freeing a space $S_1$ of start of treatment on the left, for a further barrel assembly. In this way, each barrel can traverse the entire length of the bath $V_1$, and any dripping onto underlying barrels is prevented. The intervention of the overhead travelling crane is necessary only for transportation, for a limited distance, between the end position $S_3$ downstream of a previous bath and the position upstream of a subsequent bath. In addition, since the overhead travelling crane does not operate on the tumblers located in the intermediate positions in the bath, these positions can be covered with suction hoods in a much more effective way than what has so far been achieved in traditional systems.

With reference now to FIG. 6, a washing station will be described which constitutes a characteristic of an embodiment of the system. In FIG. 6, a barrel assembly 12 is illustrated inside a washing bath VL provided with a "semi-enveloping" bottom, as has been explained above with reference to the treatment baths. The bath VL has a filler inlet 61 and a discharge outlet 62 connected to a suction pump 63. A washing tower is indicated by TL and comprises three tanks $L_1$, $L_2$, $L_3$ set one above the other. The top tank $L_3$ contains the cleanest washing liquid and has an overflow 64 leading towards the intermediate tank. The intermediate tank $L_2$ contains less clean washing liquid and has an overflow 64 leading towards the bottom tank. The bottom tank $L_1$ contains the dirtiest liquid and has an overflow 65 leading towards the discharge. The reference 66 indicates a delivery pump, and 67 a return pump. Washing is carried out first with the liquid from the tank $L_1$, then with the liquid from the tank $L_2$, and finally with the liquid from the tank $L_3$. The enveloping bottom of the bath enables maximum use of the washing liquid without unused spaces.

The process can be carried out in only one direction, either clockwise or counterclockwise, without any reversing. Consequently, in the various stages of the process, the overhead travelling crane just transfers the barrels in the direction of the process and always comes back empty. What has been said above does not rule out the possibility, in cases of particular interest, so as to save space, of reversing the direction of advance during the transportation stage and of carrying out more than one operation in the same bath; for example, washing of a basket in running water, subsequent transfer to another stage, return to the washing stage with reversal of direction of movement.

Even though the examples of systems illustrated regard systems with baths set on one level only, it is evident that the invention also includes systems with treatment and/or washing baths set on different levels.

What is claimed is:

1. A system for treatment of pieces in a bath, comprising:
    a plurality of rotatable tumbling barrels, each having perforated walls, and a plurality of supporting frames each frame for rotatably supporting a respective barrel with the barrel axis of rotation being horizontal, each said barrel and supporting frame forming a barrel assembly,
    a plurality of treatment baths arranged in succession, at least one direction of advance of the barrels in the system being defined by said baths, and at least one of said treatment baths being an extended bath that is dimensioned in a direction of advance to accommodate simultaneously a plurality of barrel assemblies, and
    a rail assembly extended in a direction of advance at least along said extended bath, said rail assembly comprising an electrical conductor structure;
    wherein, a number of said barrel assemblies concurrently have their respective barrels in at least one of said extended bath arranged with their axes of rotation substantially aligned longitudinally according to the direction of advance,
    wherein, a plurality of said barrel assemblies have a slideable support structure operative to engage said rail assembly and enable said at least one barrel assembly to be supported in at least of said extended bath and to slide in said at least one direction of advance, and
    wherein a plurality of said barrel assemblies have an electrical contact operative to engage said electrical conductor structure as said barrel assemblies are moved in said at least one direction of advance.

2. A system according to claim 1, wherein said at least one direction of advance includes the longitudinal direction of the extended bath.

3. A system according to claim 1, further comprising a pusher device in at least one of said extended baths, said pusher device comprising a pushing member moveable in a direction of advance for a stroke at least equal to a length of a barrel.

4. A system according to claim 1, characterized in that said slideable support structure includes idle wheels, at least one of the said wheels being electrically conductive, and in that said electrical conductor structure comprises a conductive longitudinal rail for contact with said at least one conductive wheel.

5. A system according to claim 4, characterized in that said supporting frame has at least one arm extending laterally and carrying a contact pad, and further has a cathodic current-drawing device in electrical contact with said contact pad and extending inside the barrel, and said electrical conductor structure comprises a cathodic longitudinal contact rail for contact with said contact pad.

6. A system according to claim 5, wherein said conductive longitudinal rail and said cathodic longitudinal contact rail are parallel and set on the same side of the bath.

7. A system according to claim 1, further comprising anodic bars set longitudinally along at least one bath on at least one side of the latter.

8. A system according to claim 3, characterized in that said pusher member is a bar of the pusher device, to which movement is imparted via a chain system, chains of said system being located at the sides of the bath.

9. A system according to claim 1, comprising suction hoods which substantially cover the entire transverse extension of the bath for a longitudinal stretch of the bath corresponding to one or more barrel lengths.

10. A system according to claim 1, further comprising lifting means for lifting up a barrel assembly at a downstream end of a bath and depositing it at an upstream end of a subsequent bath.

11. A system according to claim 10, characterized in that the said lifting means is an overhead traveling crane and said barrel assembly comprises means for being hooked by the overhead traveling crane.

12. A system according to claim 1, characterized in that at least one of the said baths is shaped so as to have a semi-cylindrical bottom having a radius greater than the maximum radius of the barrel.

13. A system according to claim 1, characterized in that it comprises a washing station with a number of tanks set in tower fashion and containing washing liquid with different percentages of impurities and means for taking the washing liquid from said tanks and introducing it into the washing bath and discharging it into the respective tank.

14. A system according to claim 1, characterized in that it comprises an even number of processing lines, and at the end of one line at least one barrel is transferred to the subsequent line which is traversed in the direction opposite to the previous line.

15. A system according to claim 1, characterized in that it comprises tunnel-type suction means.

16. A system according to claim 1, wherein said treatment is a galvanic treatment.

17. A system according to claim 10, further including transporting said barrel from the downstream end of a bath to the upstream end of the subsequent bath in the direction of the axis of rotation of the barrel.

18. A system according to claim 6, wherein said conductive longitudinal rail and said cathodic longitudinal contact rail are parallel and set on the same side of the bath.

* * * * *